United States Patent [19]
Iijima

[11] Patent Number: 5,661,357
[45] Date of Patent: Aug. 26, 1997

[54] ELECTRIC ROTATING MACHINE

[75] Inventor: Tatuo Iijima, Gunma, Japan

[73] Assignee: Sawafuji Electric Co., Ltd., Tokyo, Japan

[21] Appl. No.: 563,285

[22] Filed: Nov. 28, 1995

[30] Foreign Application Priority Data

Feb. 7, 1995 [JP] Japan .................. 7-019421

[51] Int. Cl.$^6$ .................................................. H02K 5/10
[52] U.S. Cl. .......................... 310/239; 310/242; 310/245
[58] Field of Search ............................ 310/239, 238, 310/242, 245

[56] References Cited

U.S. PATENT DOCUMENTS

| | | | |
|---|---|---|---|
| 5,055,728 | 10/1991 | Looper et al. | 310/91 |
| 5,089,735 | 2/1992 | Sawaguchi | 310/239 |
| 5,391,955 | 2/1995 | Clarke et al. | 310/245 |
| 5,444,320 | 8/1995 | Clarke et al. | 310/239 |
| 5,471,107 | 11/1995 | Rawls | 310/249 |

*Primary Examiner*—Steven L. Stephan
*Assistant Examiner*—Tran N. Nguyen
*Attorney, Agent, or Firm*—Nikaido Marmelstein Murray & Oram LLP

[57] ABSTRACT

An electric rotating machine includes a guide groove in a brush holder fixedly disposed sideways of a commutator, a coil spring mounted under compression between a closed outer end of the guide groove and a brush for exhibiting a spring force to bring an end of the brush projected from the guide groove into sliding contact with the commutator, and a cover mounted to the brush holder to cover the guide groove. The guide groove is provided at its closed outer end with a recess for receiving and holding one end of the coil spring. The brush holder includes a main holder portion having the guide groove, and a fastening portion connected to one side of the main holder portion and having a single threaded bore. The cover is of a shape to cover the brush holder and has an engage portion engages an outer side of the brush holder so as to inhibit the turning of the cover about the axis of the threaded bore. A threaded member is inserted through the cover and screwed in the threaded bore. During screwing of the threaded member, the cover can not be turned along with the threaded member, thereby facilitating the mounting of the cover to the brush holder.

5 Claims, 8 Drawing Sheets

5,661,357

ELECTRIC ROTATING MACHINE

BACKGROUND OF THE INVENTION

1. Field of the Invention

The present invention relates to an electric rotating machine including a brush holder which is fixedly disposed sideways of a commutator mounted on a rotary shaft of a rotor and which is provided with a guide groove extending radially of the rotary shaft and closed at its outer end and opened at its inner end, a coil spring mounted under compression between the closed outer end of the guide groove and a brush for exhibiting a spring force in a direction to bring that end of a brush slidably fitted in the guide groove, which projects from an inner end of the guide groove, into sliding contact with the commutator, and a cover mounted to the brush holder for covering the guide groove.

2. Description of the Prior Art

Such an electric rotating machine is conventionally known, for example, from U.S. Pat. No. 5,089,735 or the like.

In the known rotating machine, the coil spring abuts at its one end against the brush for biasing the brush toward the commutator, and abuts at the other end against the closed outer end of the guide groove. Therefore, When the brush and the coil spring are assembled into the brush holder, the coil spring is prone to spring out from the brush holder, resulting in a complicated assembling operation. Moreover, even in replacing the brush with another brush, the brush may jump out from the brush holder and be lost in some cases.

SUMMARY OF THE INVENTION

It is an object of the present invention to provide an electric rotating machine, wherein the springing-out of the coil spring from the guide groove is prevented, and it is easy to mount the cover to the brush holder, thereby facilitating the assembling and disassembling of the brush.

To achieve the above object, according to the present invention, there is provided an electric rotating machine comprising: a brush holder which is fixedly disposed at a side of a commutator mounted on a rotary shaft of a rotor; a guide groove provided in the brush holder and extending radially of the rotary shaft, an outer end of the guide groove being closed and an inner end thereof being opened; a brush slidably fitted in the guide groove; a coil spring compressed between the brush and the closed outer end of the guide groove for exhibiting a spring force in a direction to bring an end of the brush into sliding contact with the commutator; and a cover mounted to the brush holder for covering the guide groove, wherein the guide groove is provided at its closed outer end with a recess into which one end of the coil spring can be fitted and temporarily fixed; the brush holder comprises a main holder portion having the guide groove, and a fastening portion connected to one side of the main holder portion and having a threaded bore; and the cover is formed into a shape to cover the brush holder and having an engage portion which is engaged with an outer side of the brush holder in a direction to inhibit the turning of the cover about an axis of the threaded bore, and a threaded member inserted through the cover is screwed in the threaded bore.

With such construction, the springing-out of the coil spring from the guide groove is reliably prevented by one end of the coil spring being fitted into and temporarily fixed in the recess. Moreover, the engage portion of the cover is engaged with the outer side of the brush holder, whereby the turning of the cover about the axis of the threaded bore is inhibited. Therefore, during screwing of the threaded member into the threaded bore, the cover can not be turned along with the threaded member, thereby facilitating the mounting of the cover to the brush holder.

The above and other objects, features and advantages of the invention will become apparent from the following description of a preferred embodiment taken in conjunction with the accompanying drawings.

BRIEF DESCRIPTION OF THE DRAWINGS

FIGS. 1 to 12 show one embodiment of the present invention, wherein

FIG. 1 is a vertical sectional view of a D.C. motor according to an embodiment of the present invention and taken along a line 1—1 in FIG. 2;

FIG. 2 is a front view taken in a direction of an arrow 2 in FIG. 1;

FIG. 3 is a sectional view taken along a line 3—3 in FIG. 1, with a rotor and cords removed;

FIG. 4 is a sectional view taken along a line 4—4 in FIG. 1, with the rotor and the cords removed;

FIG. 5 is a front view of a second bracket with a breaker, brushes and coil springs mounted;

FIG. 6 is an exploded perspective view illustrating the second bracket, the brushes, the coil springs and covers;

FIG. 7 is an enlarged vertical sectional view taken along a line 7—7 in FIG. 1;

FIG. 8 is a sectional view taken along a line 8—8 in FIG.3;

FIG. 9 is a vertical sectional view of a casing body forming mold, taken along a line 9—9 in FIG. 10;

FIG. 10 is a sectional view taken along a line 10—10 in FIG. 9;

FIG. 11 is a sectional view taken along a line 11—11 in FIG. 10; and

FIG. 12 is a sectional view taken along a line 12—12 in FIG. 10.

DESCRIPTION OF THE PREFERRED EMBODIMENT

Figure 1:
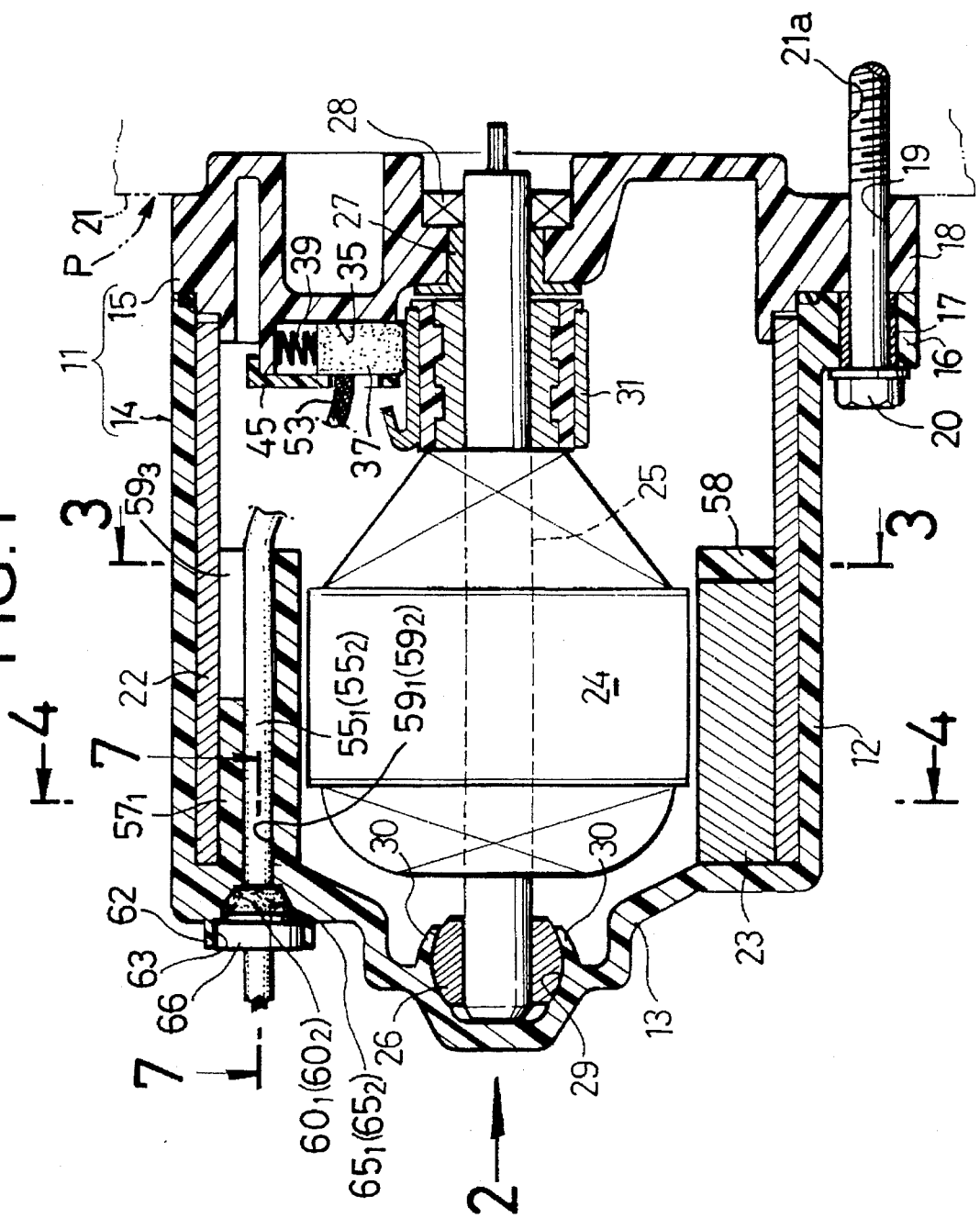
Figure 2:
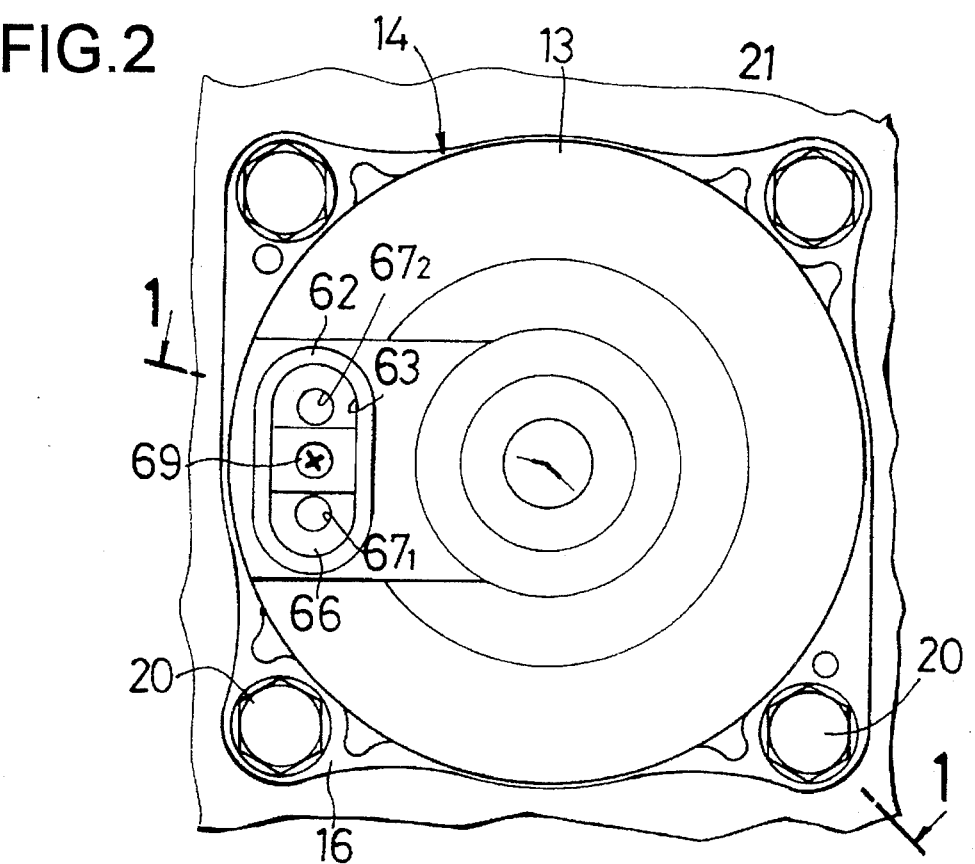

The present invention will now be described by way of a preferred embodiment applied to a D.C. motor with reference to the accompanying drawings.

Referring first to FIGS. 1 to 4, the D.C. motor is connected to a hydraulic pump P for the tilt-up operation of an outboard engine system. A casing 11 of the D.C. motor is comprised of a casing body 14 formed from a synthetic resin into a bottomed cylinder-like configuration having a first bracket 13 mounted at one end of a cylindrical portion 12, and a second bracket 15 formed from a synthetic resin and coupled to the other end of the casing body 14.

A flange 16 is provided at the other end of the cylindrical portion 12 of the casing body 14 to protrude radially outwardly. Cylindrical metal sleeves 17 are embedded in the flange 16 at four circumferentially spaced points. The second bracket 15 is formed into a disk-like configuration to close the other end of the cylindrical portion 12, and is provided with a flange 18 which corresponds to the flange 16. Insertion bores 19 corresponding to the sleeves 17 are provided in the flange 18.

Threaded bores 21a corresponding to the insertion bores 19 in the second bracket 15 are provided in a housing 21 of the hydraulic pump P. Bolts 20 inserted into the sleeves 17 and the insertion bores 19 are threadedly engaged into the threaded bores 21a, respectively. Thus, the second bracket 15 is coupled to the casing body 14 to constitute the casing 11, and the casing 11 is fixed to the housing 21 of the hydraulic pump P.

Integrally coupled to the casing body 14 are a yoke 22 which is formed into a cylindrical shape from a magnetic metal and mounted on an inner periphery of the cylindrical portion 12, and a pair of magnets 23 which are formed into an arcuate shape corresponding to an inner peripheral surface of the yoke 22 and which are disposed on an inner surface of the yoke 22 at its circumferentially spaced points.

A rotor 24 is concentrically disposed within the cylindrical portion 12 of the casing body 14 and rotatably supported by the first and second brackets 13 and 15. More specifically, one end of a rotary shaft 25 of the rotor 24 is supported on the first bracket 13 through a self-aligning metal 26. The other end of the rotary shaft 25 is extended through the second bracket 15 toward the housing 21. A metal bearing 27 and an annular seal member 28 are interposed between the second bracket 15 and the rotary shaft 25.

A supporting recess 29 and a plurality of retaining claws 30 are provided on an inner surface of a central portion of the first bracket 13 along an outer surface of the self-aligning metal 26. The retaining claws 30 are disposed at circumferentially equally spaced locations around the supporting recess 29 and connected to an inner surface of the supporting recess 29. The self-aligning metal 26 is fitted into the supporting recess 29 while flexing the retaining claws 30 in an expanding direction and is slidably retained by the supporting recess 29 and the retaining claws 30. The first bracket 13 is integrally formed with the cylindrical portion 12 from a Synthetic resin. And at the time of molding the first bracket 13, the supporting recess 29 and the retaining claws 30 are simultaneously formed. Therefore, it is unnecessary to fix a member for retaining the self-aligning metal 26 to the first bracket 13, thereby making it possible to reduce the number of parts and the number of working steps.

Figure 5:
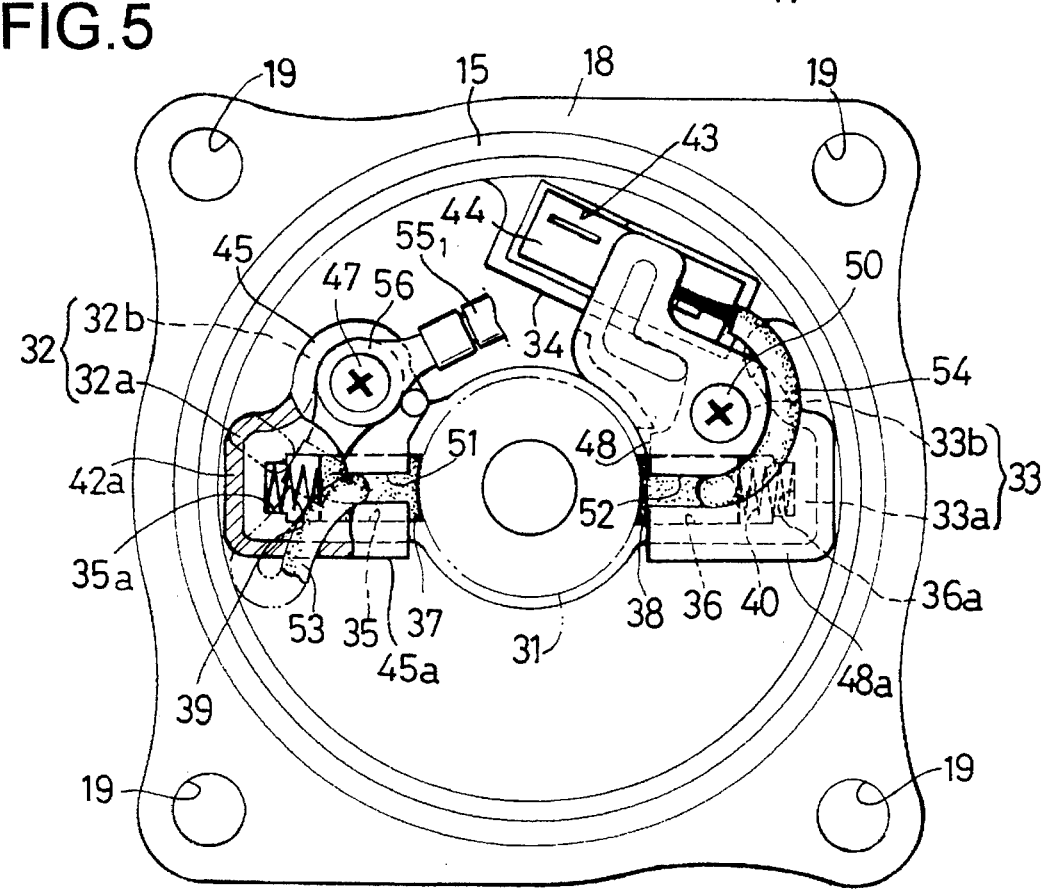
Figure 6:
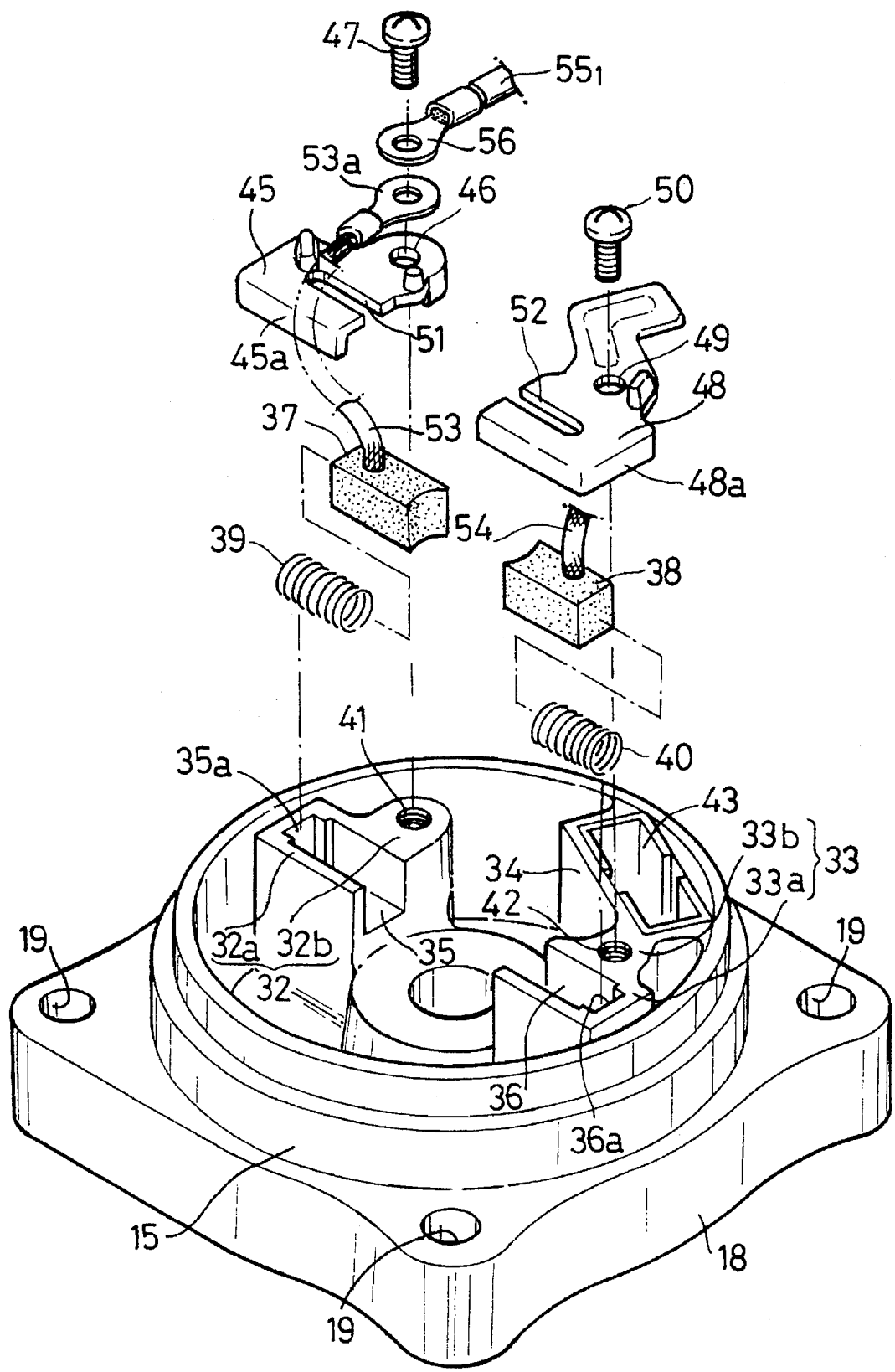

Referring also to FIGS. 5 and 6, a commutator 31 is mounted on the rotary shaft 25 of the rotor 24 adjacent the second bracket 15. The second bracket 15 is integrally provided in its inner surface with first and second brush holders 32 and 33 which rise inwardly in an axial direction of the rotary shaft 25 on a diametrical line of the commutator 31, and with a breaker holder 34 which rise inwardly in the axial direction of the rotary shaft 25 at a location in proximity to the second brush holder 33.

Each of the brush holders 32 and 33 includes a main holder portion 32a, 33a formed into a substantially U-shape in cross section and extending radially of the rotary shaft 25, and a fastening portion 32b, 33b connected to one side of the main portions 32a, 33a. The fastening portion 33b is provided to extend between the main portion 33a and the breaker holder 34.

Guide grooves 35 and 36 are provided in the main holder portions 32a and 33a, respectively and extend radially of the rotary shaft 25. Outer ends of the guide grooves 35 and 36 are closed and inner ends thereof are opened. Brushes 37 and 38 are slidably fitted in the guide grooves 35 and 36, respectively. Coil springs 39 and 40 are compressed between the brushes 37 and 38 and the closed outer ends of the guide grooves 35 and 36 for exhibiting a spring force in a direction to bring ends of the brushes 37 and 38 protruding from inner ends of the guide grooves 35 and 36 into sliding contact with the commutator 31, respectively. Moreover, each of the guide grooves 35 and 36 has a recess 35a, 36a provided at its radially outer closed end, into which one end of corresponding one of the coil springs 39 and 40 can be fitted for temporary fixing of the coil springs 39 and 40. Threaded bores 41 and 42 are provided in the fastening portions 32b and 33b and have axes parallel to the rotary shaft 25.

An accommodation recess 43 is provided in the breaker holder 34, and a breaker 44 is fitted into the accommodation recess 43.

A cover 45 is mounted to the first brush holder 32 to cover the first brush holder 32 in order to inhibit the slip-off of the brush 37 from the guide groove 35. More specifically, an insertion bore 46 corresponding to the threaded bore 41 is provided in the cover 45, and the cover 45 is fastened to the first brush holder 32 by threadedly inserting a threaded member 47 through the insertion bore 46 into the threaded bore 41. Moreover, the cover 45 has an engage portion 45a provided thereon, which is engaged with an outer side of the first brush holder 32 in a direction to inhibit the turning of the cover 45 about an axis of the threaded bore 41.

A cover 48 is mounted to the second brush holder 33 to cover the entire surface of the second brush holder 33 and a portion of the breaker holder 34 in order to inhibit the slip-off of the brush 38 from the guide groove 36 and the slip-off of the breaker 44 from the accommodation recess 43 in the breaker holder 34. More specifically, an insertion bore 49 corresponding to the threaded bore 42 is provided in the cover 48, and the cover 48 is fastened to the second brush holder 33 by threadedly inserting a threaded member 50 through the insertion bore 49 into the threaded bore 42. Moreover, the cover 48 is provided with an engage portion 48a, which is engaged with an outer side of the second brush holder 33 in a direction to inhibit the turning of the cover 48 about an axis of the threaded bore 42.

Slits 51 and 52 are provided in those portions of the covers 45 and 48 which correspond to the guide grooves 35 and 36, respectively, to extend a long distance along one diametrical line of the rotary shaft 25. Connection cords 53 and 54 connected to the brushes 37 and 38 are drawn from the slits 51 and 52, respectively. The connection cord 53 is connected at its one end to the brush 37, and at the other end to a terminal 53a. The terminal 53a is fixed to the cover 45 by the threaded member 47 along with a terminal 56 which is provided at an end of a cord $55_1$ drawn outwardly from the first bracket 13. The connection cord 54 is connected at its one end to the brush 38, and is electrically connected at the other end to one end of the breaker 44. A cord $55_2$ drawn outwardly from the first bracket 13 is electrically connected to the other end of the breaker 44. Thus, the cord $55_1$ is connected to the brush 37 through the connection cord 53, and the cord $55_2$ is connected to the brush 38 through the breaker 44 and the connection cord 54. These cord $55_1$ and $55_2$ are drawn outwardly from the first bracket 13.

Figure 7:
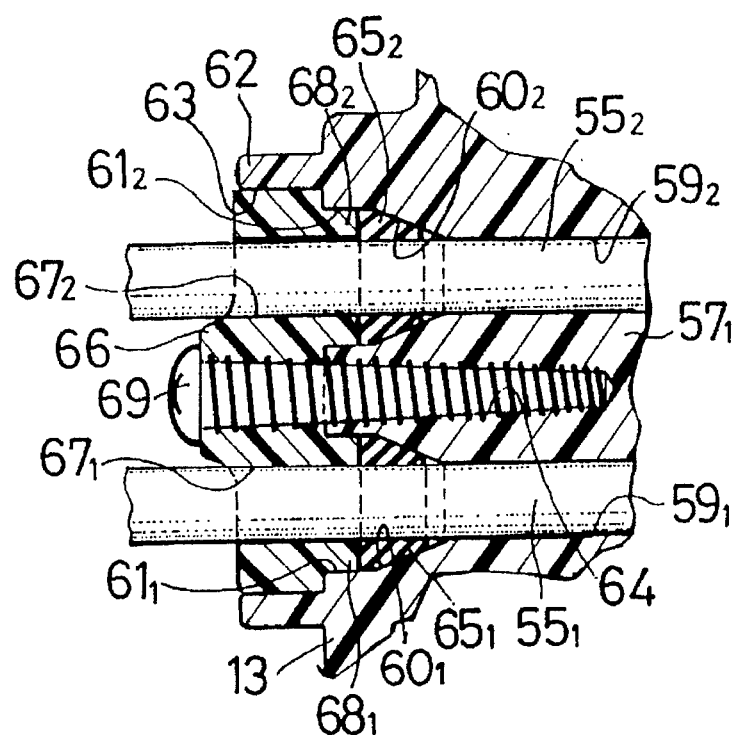
Figure 8:
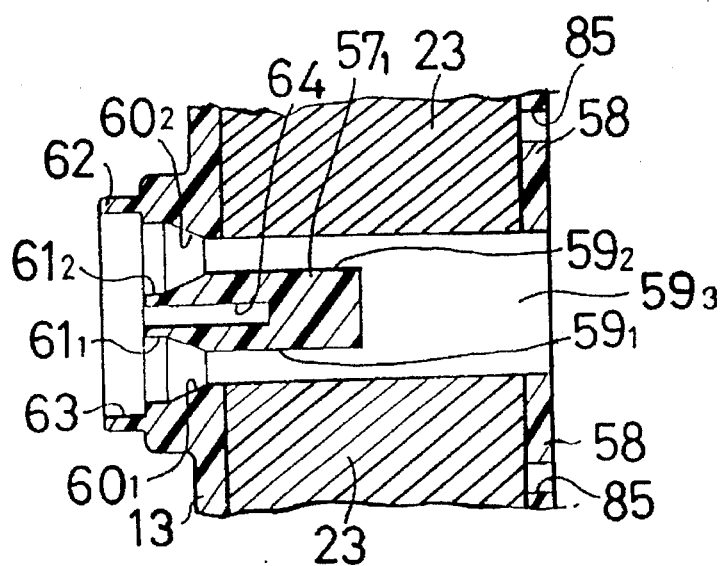
Figure 9:
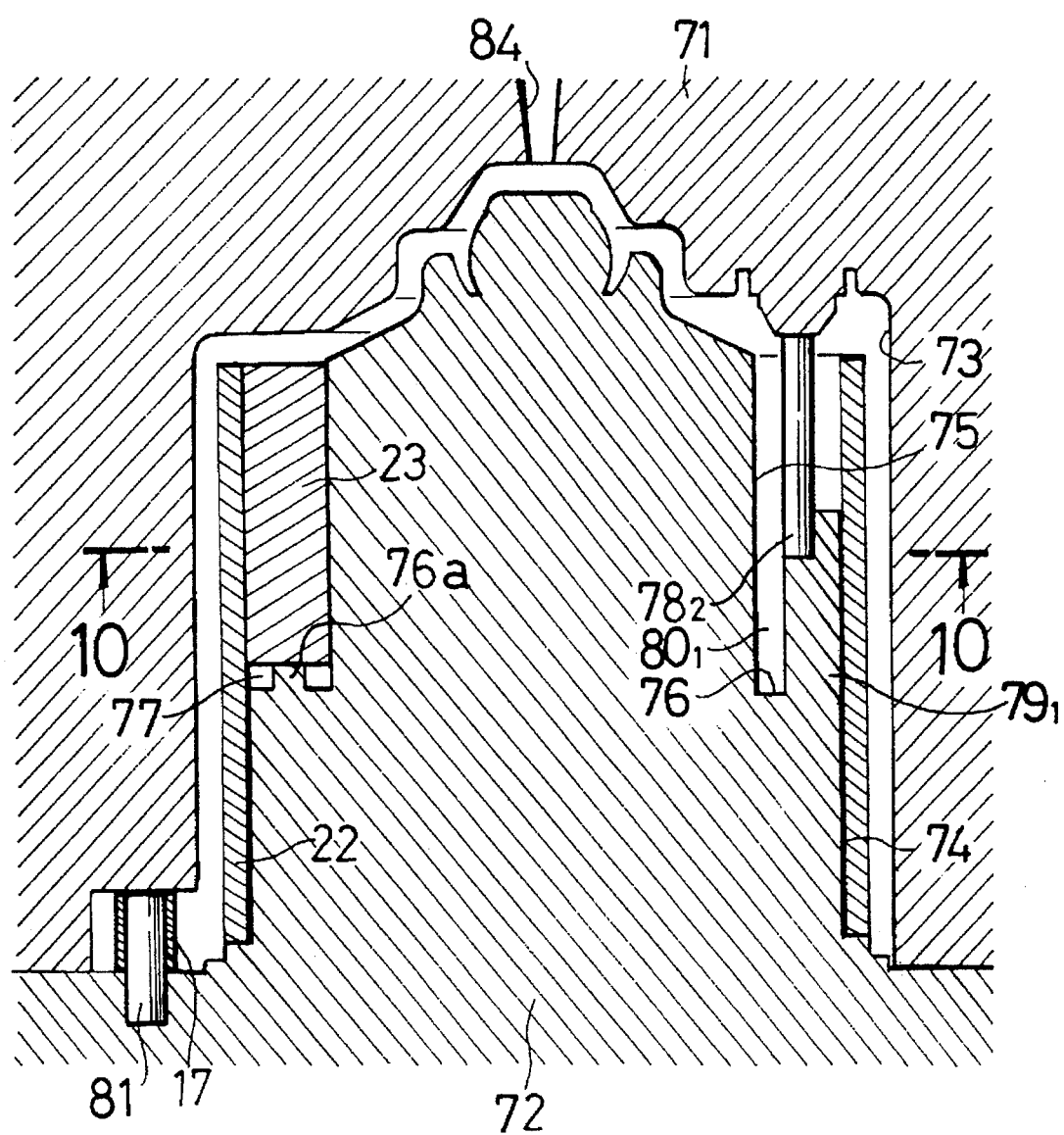
Figure 10:
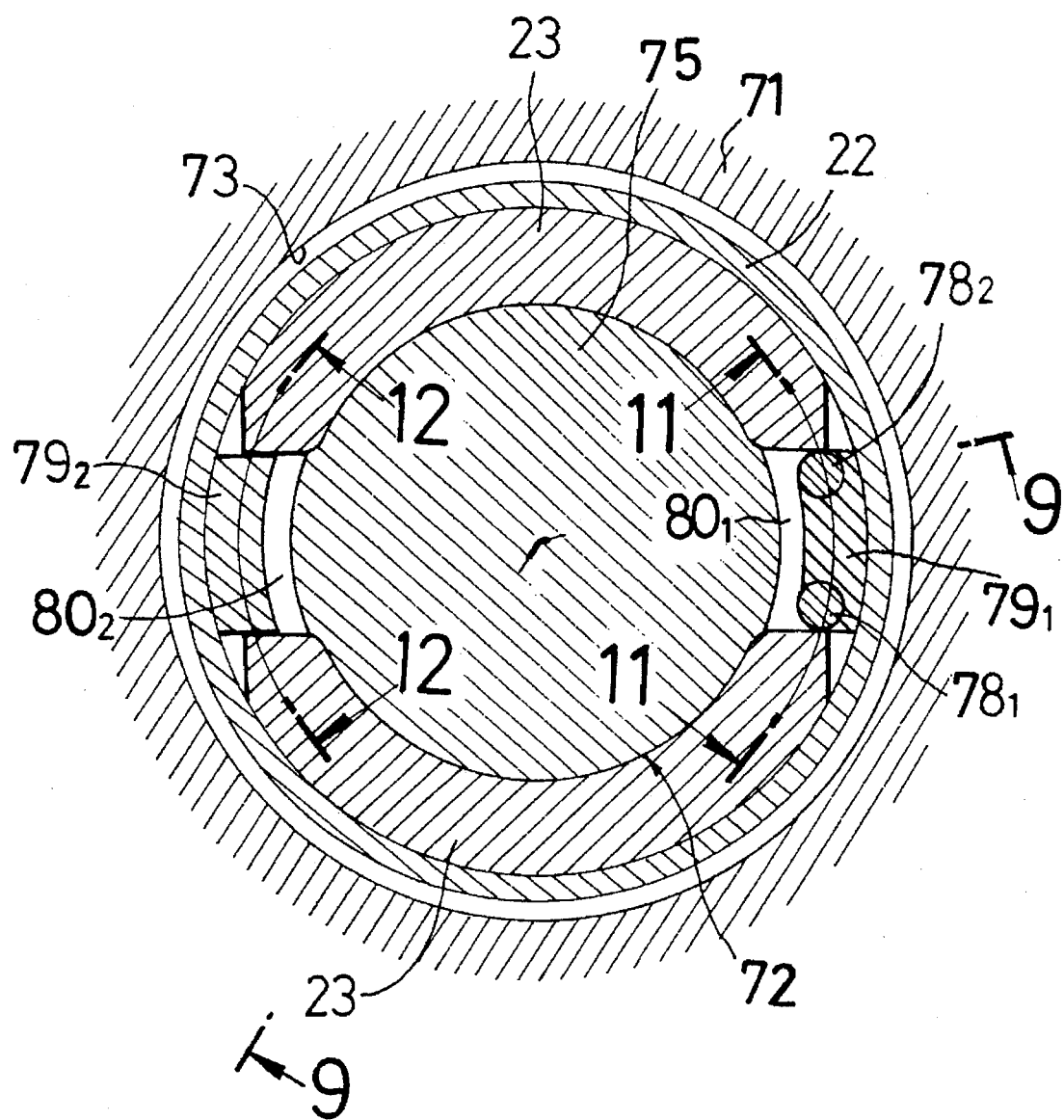
Figure 11:
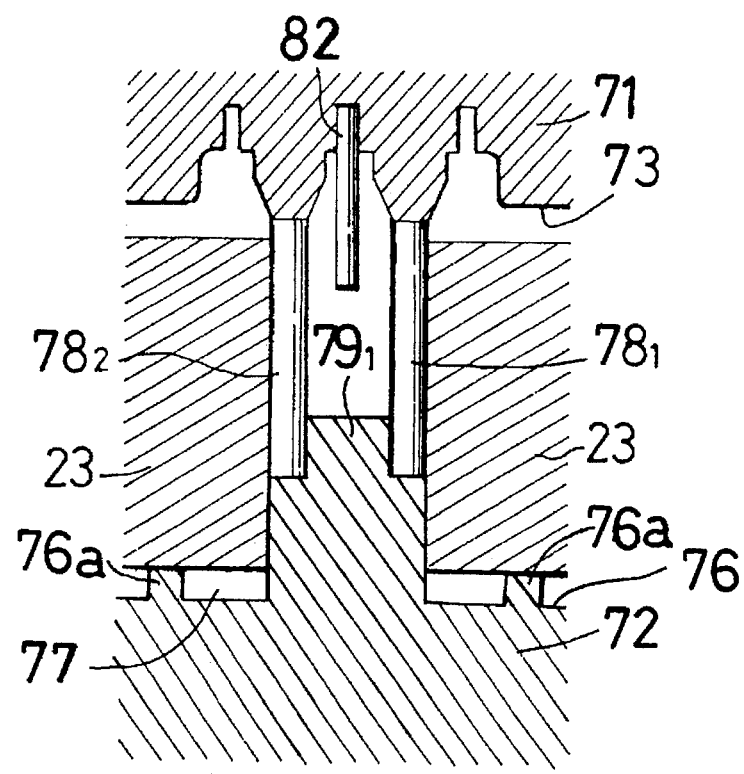
Figure 12:
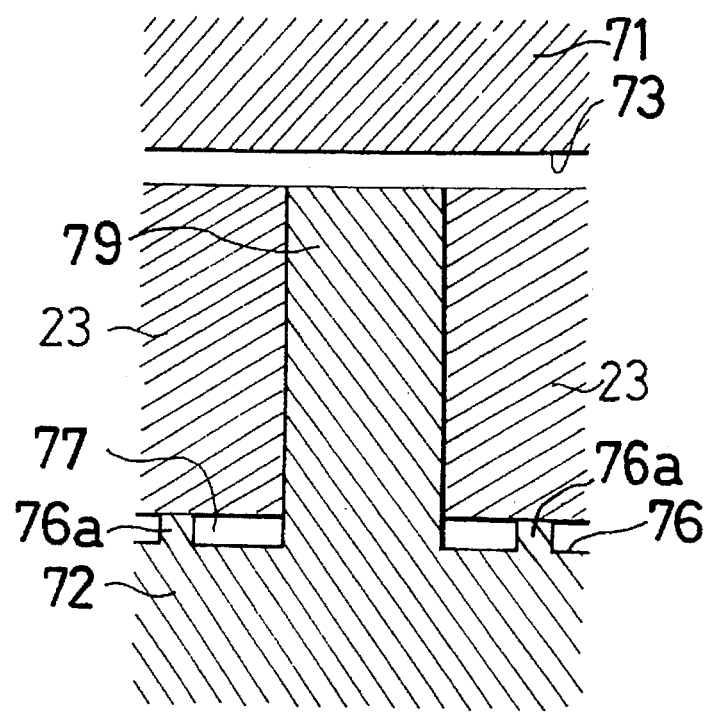

Referring also to FIGS. 7 and 8, base ends of clamping portions $57_1$ and $57_2$ are continuously formed with the first bracket 13 of the casing body 14 at locations equally spaced apart from each other in a circumferential direction of the cylindrical portion 12. The clamping portions $57_1$ and $57_2$ extend toward the second bracket 15 in the axial direction of the cylindrical portion 12. That is, the clamping portions $57_1$ and $57_2$ are continuously formed with the first bracket 13 so as to clamp the yoke 22 between the clamping portions $57_1$ and $57_2$ and the inner surface of the cylindrical portion 12. The distance between both the clamping portions $57_1$ and $57_2$ is set such that circumferentially opposite side ends of the magnets 23 are defined by the clamping portions $57_1$ and $57_2$, respectively. The inner surface of each of the clamping portions $57_1$ and $57_2$ is formed into an arcuate shape in such a manner that it is substantially in line with the inner surface of the magnet 23 which is in abutment against the inner surface of the yoke 22.

Moreover, magnet retaining portions 58 extend from tip ends of the clamping portions $57_1$ and $57_2$ in the circumferentially opposite directions of the cylindrical portion 12. The magnets 23 are in abutment against the inner surface of the yoke 22 with their opposite ends in the circumferential direction of the cylindrical portion 12 being defined by the clamping portions $57_1$ and $57_2$. One ends of the magnets 23 in the axial direction of the cylindrical portion 12 are in abutment against the first bracket 13. The other ends of the magnets 23 are received by the magnet retaining portions 58. The magnet retaining portions 58 extending from the clamping portion $57_1$ and the magnet retaining portions 58 extending from the clamping portion $57_2$ are interconnected in this embodiment, and alternatively, they may be separated from each other.

A pair of insertion bores $59_1$ and $59_2$ are provided in one $57_1$ of the clamping portions $57_1$ and $57_2$ at its base end to extend axially of the cylindrical portion 12, so that portions of the ends of the magnets 23 face the insertion bores $59_1$ and $59_2$. A lightening recess $59_3$ is also provided in one clamping portion $57_1$ to lead to the insertion bores $59_1$ and $59_2$ at the tip end of clamping portion $57_1$.

The following bores are provided in the first bracket 13: tapered bores $60_1$ and $60_2$ which coaxially connected to the insertion bores $59_1$ and $59_2$, respectively and tapered such that the diameter is gradually increased in an axially outward direction; and fitting bores $61_1$ and $61_2$ which are coaxially connected to large-diameter ends of the tapered bores $60_1$ and $60_2$ and open into the outer surface of the first bracket 13. A ridge 62 is provided on the outer surface of the first bracket 13, such that an oval-shaped fitting recess 63 is defined and connected to both of the fitting bores $61_1$ and $61_2$. A bottomed fastening bore 64 is provided in the first bracket 13 and the clamping portion $57_1$, such that it opens into the outer surface of the first bracket 13 between both the fitting bores $61_1$ and $61_2$.

The cord $55_1$ connected to the brush 37 through the connection cord 53 as well as the cord $55_2$ connected to the brush 38 and the breaker 44 through the connection cord 54 are inserted through the insertion bores $59_1$ and $59_2$ and the lightening recess $59_3$. Grommets $65_1$ and $65_2$ made of an elastomeric material are fitted into the tapered bores $60_1$ and $60_2$, and the cords $55_1$ and $55_2$ are passed through the grommets $65_1$ and $65_2$.

A holder 66 is fitted into the fitting recess 63 in the first bracket 13 and has a pair of bores $67_1$ and $67_2$, through which the cords $55_1$ and $55_2$ are inserted. The holder 66 is also provided with urging pins $68_1$ and $68_2$ which are each formed into a cylindrical shape and coaxially connected to the bores $67_1$ and $67_2$ and which are fitted into the fitting bores $61_1$ and $61_2$ to abut against the grommets $68_1$ and $68_2$, respectively.

The holder 66 is fastened to the first bracket 13 by screwing, into the fastening bore 64, a threaded member 69 inserted through the holder 66. In such a condition, the grommets $65_1$ and $65_2$ are urged against inner surfaces of the tapered bores $60_1$ and $60_2$ by the urging pins $68_1$ and $68_2$ of the holder 66, and compressed axially into close contact with the cords $55_1$ and $55_2$. This achieves a reliable water-proof sealing at drawn-out portions of the cords $55_1$ and $55_2$ and inhibits the movement of the cords $55_1$ and $55_2$ in a drawing-out direction.

The yoke 22 is sandwiched between the clamping portions $57_1$ and $57_2$ and the cylindrical portion 12 in the casing body 14. The magnets 23 are in abutment against the inner surface of the yoke 22 with their opposite side ends in the circumferential direction of the cylindrical portion 12 being defined by the clamping portions $57_1$ and $57_2$. Opposite ends of the magnets 23 in the axial direction of the cylindrical portions 12 are defined by the first bracket 13 and the magnet retaining portions 58. When the casing body 14 is molded, the yoke 22 and the pair of magnets 23 are integrally coupled to the casing body 14. A mold for forming the casing body 14 will be described below.

Referring to FIGS. 9 to 12, in forming the casing body 14, an upper die 71 and a lower die 72 movable toward and from each other are prepared. A forming recess 73 is provided in the upper die 71 to face the lower die 72 and conformed to the contour of the outer surface of the casing body 14 to be molded. The lower die 72 is provided with a large-diameter columnar portion 74 which protrudes into the forming recess 73 so as to mate with a substantially half of the yoke 22, and a smaller-diameter columnar portion 75 which defines the inner peripheral surfaces of the pair of magnets 23 in abutment against the yoke 22. An annular stepped portion 76 is formed between the large-diameter columnar portion 74 and the smaller-diameter columnar portion 75. A plurality of projections 76a circular in cross section are provided at distances on the stepped portions 76 at locations corresponding to the magnets 23.

Figure 3:
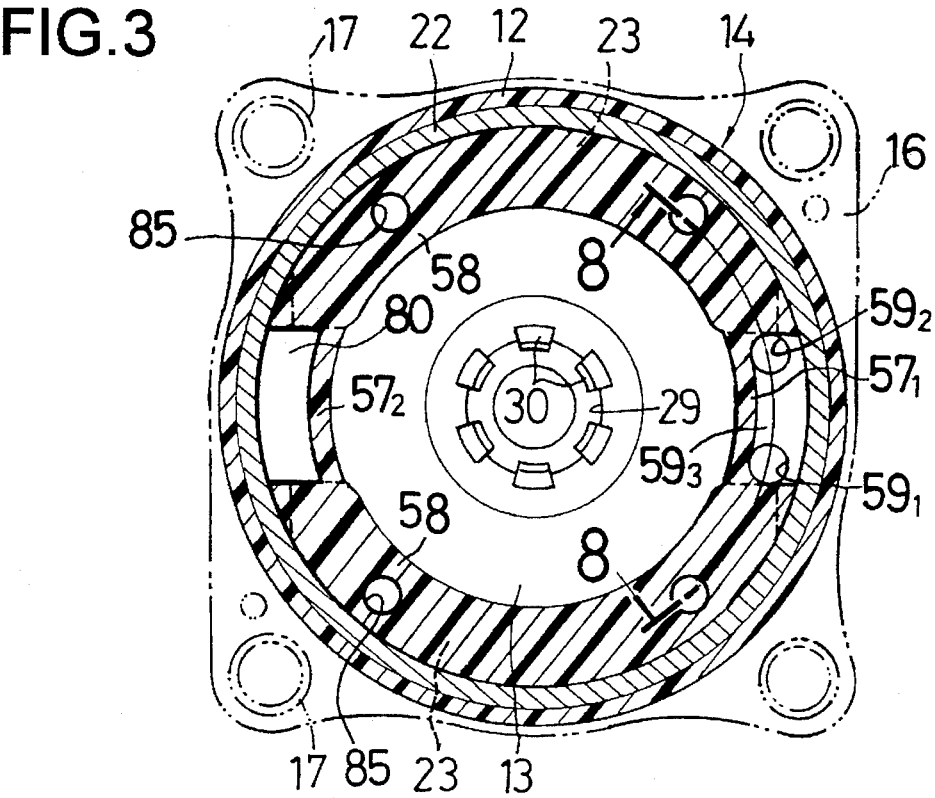

In a condition in which the upper and lower dies 71 and 72 have been opened, the yoke 22 is mounted to the lower die 72 in such a manner that the large-diameter columnar portion 74 is fitted to a lower half of the yoke 22. The pair of magnets 23 are inserted between the yoke 22 and the smaller-diameter columnar portion 75 at two circumferentially equally spaced points and received by the projections 76a on the stepped portion 76. Thus, spaces 77 for forming the magnet retaining portions 58 are defined between the magnets 23 and the stepped portion 76, and bores 85 corresponding to the projections 76a are defined in the magnet retaining portions 58, as shown in FIG. 3.

A limiting portion $79_1$ for forming the lightening recess $59_3$ in the clamping portion 57 in one of the spaces between both the magnets 23 is provided in the lower die 72 so as to define a gap 80, between the limiting portion $79_1$ itself and an outer surface of the smaller-diameter columnar portion $57_1$. A pair of limiting pins $78_1$ and $78_2$ are embedded in the lower die 72. A limiting portion $79_2$ is provided in the lower die 72 in the other of the spaces between both the magnets 23 so as to define a gap $80_2$ between the limiting portion $79_2$ itself and the outer surface of the smaller-diameter columnar portion $57_1$.

The limiting pins $78_1$ and $78_2$ and the limiting portion $79_1$ abut against one side ends of the magnets 23 in the circumferential direction of the yoke 22 to limit the movement of the magnets 23 toward each other in the circumferential direction of the yoke 22, respectively. The limiting pins $78_1$ and $78_2$ also serve to form the pair of insertion bores $59_1$ and $59_2$ in the clamping portion $57_1$ after formation of the casing body 14.

Figure 4:
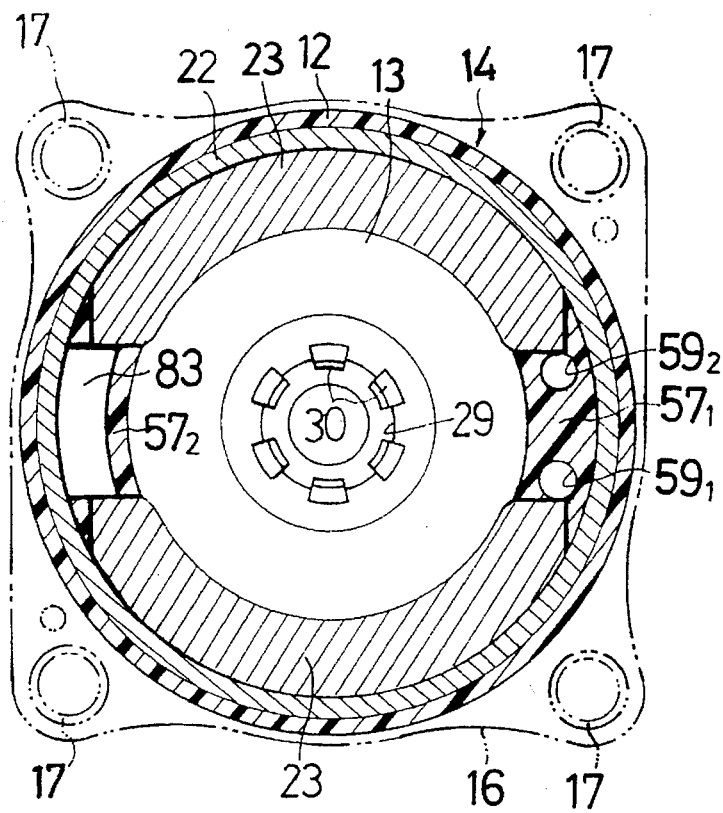

The other side ends of the magnets 23 in the circumferential direction of the yoke 22 abut against the limiting portion $79_2$, so that the movement of the magnets 23 toward each other in the circumferential direction of the yoke 22 is also limited by the limiting portion $79_2$. Thus, a gap 83 is defined in the clamping portion $57_2$ of the casing body 14 at a location corresponding to the limiting portion $79_2$, as shown in FIGS. 3 and 4.

Further, support pins 81 for supporting the sleeves 17 are embedded in the lower die 72, while pin 82 for forming the fastening bore 64 is embedded in the upper die 71, and a pouring port 84 for pouring a synthetic resin is provided in the upper die 71.

The operation of this embodiment will be described below. The first and second brush holders 32 and 33 are integrally provided on the second bracket 15 made of a synthetic resin. It is unnecessary to provide an exclusive component in addition to the second bracket 15. This contributes to a reduction in number of parts or components.

Since the recesses 35a and 36a are provided at the closed outer ends of the guide grooves 35 and 36 provided in the brush holders 32 and 33, and since one ends of the coil springs 39 and 40 can be fitted into and temporarily fixed in the recesses 35a and 36a, it is possible to reliably prevent the jumping-out of the coil springs 39 and 40 from the guide grooves 35 and 36, when the brushes 37 and 38 are mounted to the brush holders 32 and 33, or replaced by other brushes. It is also possible to facilitate the assembling and replacing of the brushes 37 and 38, and the coil springs 39 and 40 can not be lost.

Moreover, one ends of the coil springs 39 and 40 can not jounce at the closed outer ends of the guide grooves 35 and 36, and spring forces in the longitudinal direction of the guide grooves 35 and 36, i.e., in the radial direction of the commutator 31 are applied to the brushes 37 and 38 from the coil springs 39 and 40. Thus, it is possible to prevent uneven wearing of the brushes 37 and 38.

In addition, the turning of the covers 45 and 48 about the axes of the threaded bores 41 and 42 are inhibited by the engagement of the engage portions 45a and 48a of the covers 45 and 48 with the outer sides of the brush holders 32 and 33, respectively. Therefore, when the threaded members 47 and 50 are screwed into the threaded bores 41 and 42, the covers 45 and 48 can not be turned with such screwing. Thus, the mounting of the covers 45 and 48 to the brush holders 32 and 33 is facilitated, and the assembling of the brushes 37 and 38 can be achieved easier.

When the casing body 14 is molded from a synthetic resin into the bottomed cylinder-like configuration with the first bracket 13 provided at one end of the cylindrical portion 12, the yoke 22 and the pair of magnets 23 are integrally coupled to the casing body 14. The yoke 22 is sandwiched between the clamping portions $57_1$ and $57_2$ and the cylindrical portion 12 of the casing body 14. The magnets 23 abut against the inner surface of the yoke 22 with their opposite side ends in the circumferential direction of the cylindrical portion 12 being defined by the clamping portions $57_1$ and $57_2$ and with their opposite ends in the axial direction of the cylindrical portion 12 being defined by the first bracket 13 and the magnet retaining portions 58. Multi-stage drawing steps were required in the production of the known electric rotating machine in which a bottomed cylinder-like casing body is integrally formed with a cylindrical yoke and a bracket integrally formed from a magnetic sheet metal by drawing. On the contrast, for producing the electric rotating machine according to the present invention, only molding of the casing body 14 is required, which can contribute to a substantial reduction in number of producing steps.

Moreover, even when the electric rotating machine is used in a corrodible environment such as on the sea, it is unnecessary to subject the electric rotating machine to a plating or a coating and yet, a sufficient anti-corrosion can be obtained, because the casing body 14 is made of synthetic resin. Because the plating or coating is not required, it is possible to reduce the number of producing steps.

In addition, because the pair of magnets 23 are formed integrally on the casing body 14 upon molding of the casing body 14, there is no need for a bonding which has been required in the prior art. This also makes it possible to reduce the number of producing steps and to eliminate the need for a separate producing line required for the bonding, thereby establishing a consistent producing line.

Further, the insertion bores $59_1$ and $59_2$ provided in the clamping portion $57_1$ for receiving the cords $55_1$ and $55_2$ are formed by the limiting pins $78_1$ and $78_2$ provided on the lower die 72 to define circumferentially one side ends of the pair of magnets 23 upon the molding of the casing body 14. Therefore, it is possible to simplify the structure of the lower die 72 and to simplify the casing body 14 itself by providing the limiting pins $78_1$ and $78_2$ with two functions.

The cords $55_1$ and $55_2$ inserted through the insertion bores $59_1$ and $59_2$ are also inserted through the grommets $65_1$ and $65_2$ made of the elastomeric material. The grommets $65_1$ and $65_2$ are fitted into the tapered bores $60_1$ and $60_2$ provided in the first bracket 13. Moreover, the grommets $65_1$ and $65_2$ are urged against the inner surfaces of the tapered bores $60_1$ and $60_2$ and compressed axially to come into close contact with the outer surfaces of the cords $55_1$ and $55_2$ by the abutment of the holder 66 fastened to the first bracket 13 against the grommets $65_1$ and $65_2$. Therefore, by the fastening of the holder 66 to the first bracket 13, a reliable water-proof sealing of the drawn-out portions of the cords $55_1$ and $55_2$ is achieved, and the movement of cords $55_1$ and $55_2$ in the drawing-out direction is inhibited. Thus, it is possible to provide a reduction in number of parts or components and to facilitate the assembling.

Although the embodiment of the present invention has been described in detail, it will be understood that the present invention is not limited to the above-described embodiment, and various modifications in design may be made without departing from the spirit and scope of the invention defined in claims.

For example, the present invention is also applicable to a D.C. motor having four or more magnets.

What is claimed is:

1. An electric rotating machine comprising:
    a brush holder which is fixedly disposed at a side of a commutator mounted on a rotary shaft of a rotor, said brush holder comprising a main holder portion and a fastening portion, said fastening portion integrally connected to one side of said main holder portion and having a threaded bore;
    a guide groove provided in an inside surface of said main holder portion and extending radially of said rotary shaft, an outer end of said guide groove being closed by said main holder portion and an inner end thereof being opened;
    a brush slidably fitted in said guide groove;
    a coil spring compressed between said brush and the closed outer end of said guide groove for exhibiting a spring force in a direction to bring an end of said brush into sliding contact with said commutator; and
    a cover mounted to said brush holder for covering said main holder portion and said fastening portion,
    wherein said guide groove is provided at its closed outer end with a recess into which one end of said coil spring can be fitted and temporarily fixed;
    said cover is formed into a shape to cover said brush holder and said cover having a downwardly extending engage portion which is engaged with an outside surface of said main holder portion in a direction to inhibit the turning of said cover about an axis of said threaded bore; and a threaded member inserted through said cover is screwed in said threaded bore.

2. An electric rotating machine according to claim 1, further including a casing which comprises a casing body formed from a synthetic resin into a bottomed cylinder-like configuration including a cylindrical portion surrounding a cylindrical yoke and a first bracket integrally formed at one end of said cylindrical portion for rotatably supporting one end of the rotary shaft, and a second bracket rotatably supporting the other end of said rotary shaft and coupled to the other end of said casing body, said casing body being provided with a plurality of clamping portions connected at their base ends to said first bracket at locations equally spaced apart from one another in a circumferential direction of said cylindrical portion to extend toward the axially other end of said cylindrical portion, magnet retaining portions extending from tip ends of said clamping portions on opposite sides in the circumferential direction of said cylindrical portion, said cylindrical yoke sandwiched between each of said clamping portions and said cylindrical portion, and magnets abutting against an inner surface of said yoke with opposite side ends of said magnets in the circumferential direction of said cylindrical portion being defined by said clamping portions and with opposite ends of said magnets in an axial direction of said cylindrical portion being defined by said first bracket and said magnet retaining portions, and at the time of molding said casing body, said yoke and said magnets are integrally coupled to said casing body.

3. An electric rotating machine according to claim 2, further including a pair of insertion bores formed in one of said clamping portions by a pair of limiting pins provided in a mold in order to define one side ends of said magnets at the time of molding said casing body, and a pair of cords connected to a pair of said brushes in sliding contact with said commutator and drawn out to the outside of said casing body through said insertion bores.

4. An electric rotating machine according to claim 3, further including: tapered bores provided in said first bracket and coaxially connected to the corresponding insertion bores, the diameter of each said tapered bores being increased in an axially outward direction; grommets made of an elastomeric material and fitted into said tapered bores, said cords being passed through said grommets; and a holder fastened to said first bracket to abut against said grommets.

5. An electric rotating machine comprising:

a brush holder which is fixedly disposed at a side of a commutator mounted on a rotary shaft of a rotor, said brush holder comprising a main holder portion and a fastening portion, said fastening position integrally connected to one side of said main holder portion and having a threaded bore;

a guide groove provided in an inside surface of said main holder portion and extending radially of said rotary shaft, an outer end of said guide groove being closed by said main holder portion and an inner end thereof being opened;

a brush slidably fitted in said guide groove;

a coil spring compressed between said brush and the closed outer end of said guide groove for exhibiting a spring force in a direction to bring an end of said brush into sliding contact with said commutator; and a cover mounted to said brush holder for covering said main holder portion and said fastening portion, wherein said guide groove is provided at its closed outer end with a recess into which one end of said coil spring can be fitted and temporarily fixed;

said cover is formed into a shape to cover said brush holder and said cover having a downwardly extending engage portion which is engaged with an outside surface of said main holder portion in a direction to inhibit the turning of said cover about an axis of said threaded bore;

a threaded member inserted through said cover is screwed in said threaded bore; and a casing which comprises a casing body formed from a synthetic resin into a bottomed cylinder-like configuration including a cylindrical portion surrounding a cylindrical yoke and a first bracket integrally formed at one end of said cylindrical portion for rotatably supporting one end of the rotary shaft, and a second bracket rotatably supporting the other end of said rotary shaft and coupled to the other end of said casing body, said casing body being provided with a plurality of clamping portions connected at their base ends to said first bracket at locations equally spaced apart from one another in a circumferential direction of said cylindrical portion to extend toward the axially other end of said cylindrical portion, magnet retaining portions extending from tip ends of said clamping portions on opposite sides in the circumferential direction of said cylindrical portion, said cylindrical yoke sandwiched between each of said clamping portions and said cylindrical portion, and magnets abutting against an inner surface of said yoke with opposite side ends of said magnets in the circumferential direction of said cylindrical portion being defined by said clamping portions and with opposite ends of said magnets in an axial direction of said cylindrical portion being defined by said first bracket and said magnet retaining portions, and at the time of molding said casing body, said yoke and said magnets are integrally coupled to said casing body.

* * * * *